United States Patent Office 3,343,939
Patented Sept. 26, 1967

3,343,939
METHOD COMPRISING THE APPLICATION OF A PHOSPHORUS SULFIDE-AMMONIA SOLUTION TO THE SOIL
Maurice A. Larson, Ames, Iowa, and Ki Choong Hong, Fullerton, Calif., assignors to Iowa State University Research Foundation, Inc., Ames, Iowa, a corporation of Iowa
No Drawing. Filed Sept. 20, 1966, Ser. No. 580,618
6 Claims. (Cl. 71—32)

This application is a continuation-in-part of our co-pending application Ser. No. 277,010, filed Apr. 30, 1963, and now abandoned.

This invention relates to a method of supplying phosphorus to the soil in combination with the supplying of nitrogen to the soil with liquid ammonia. The invention is adaptable to mixed liquid fertilizers which are capable of supplying the soil with nitrogen, phosphorus, and potassium.

Phosphorus sulfides, such as $P_4S_3$, $P_4S_5$, $P_4S_7$, and $P_4S_{10}$, contain the plant nutrient phosphorus in relatively high weight fractions, but the phosphorus therein is not in a form available for plant use under conditions normally encountered in agricultural soil. Phosphorus sulfides have limited water solubility. They provide only small percentages of available phosphorus as determined by standard fertilizer tests.

Using a standard test for water-soluble phosphorus as specified in Fertilizers 2.029, 20.030 in the Official Methods of Analysis of the Association of Official Agricultural Chemists, tests were made with three phosphorus sulfides, specifically, phosphorus sesquisulfide ($P_4S_3$), phosphorus heptasulfide ($P_4S_7$), and phosphorus pentasulfide ($P_4S_{10}$ or $P_2S_5$). Prior to the tests the phosphorus sulfides were wet-washed with nitric and perchloric acid to remove elemental sulfur. The results of the tests are set out below in Table A.

TABLE A

| Phosphorus sulfide: | Water soluble $P_2O_5$, percent |
|---|---|
| Sesquisulfide | 3.34 |
| Heptasulfide | 15.45 |
| Pentasulfide | 15.42 |

This invention is based in part on the discovery that phosphorus sulfides dissolve in and form water-soluble complexes with liquid anhydrous ammonia. The application of such solutions to soil results in the deposition of ammoniated phosphorus sulfides which contain the phosphorus in a readily available form. The ammonia-phosphorus sulfide complexes can be precipitated as recovered from the liquid ammonia while retaining their water solubility. This shows that the marked increase in phosphorus availability is due to the complex, and not to the presence of free ammonia, or to the dissolving of free ammonia in water to form an alkaline solution.

A principal object of the present invention to provide a method of using phosphorus sulfides to supply phosphorus to the soil in a form available for use by growing plants. A related object is to provide an improved method of using liquid ammonia as a fertilizer wherein the liquid ammonia is modified prior to application to improve its properties and to provide additional fertilizer elements. Further objects and advantages will be indicated in the following detailed specification.

In practicing the method of this invention, the phosphorus sulfide is dissolved in liquid anhydrous ammonia. The resulting solution can be applied to the soil as desired either immediately or after a storage period. All phosphorus sulfides can be used. The preferred compounds are phosphorus pentasulfide ($P_2S_5$ or $P_4S_{10}$), phosphorus sesquisulfide ($P_4S_3$), and phosphorus heptasulfide ($P_4S_7$). Phosphorus pentasulfide is especially desirable. However, other phosphorus sulfides can be used such as $P_4S_5$, and more than one phosphorus sulfide can be used.

The dissolving of the phosphorus sulfide in anhydrous liquid ammonia has the advantage of substantially reducing the vapor pressure of the liquid ammonia. This facilitates storage and application of the ammonia solution. The degree of reduction in vapor pressure varies somewhat with the temperature of the liquid ammonia. For example, a vapor pressure of 70% of that observed for pure ammonia is observed when a solution containing 52% $P_4S_{10}$ is prepared at 20° C.

It will be appreciated that the saturation solubility in liquid ammonia will vary with the particular phosphorus sulfide and with the temperature of the liquid ammonia. For example, the maximum solubility of $P_4S_7$ at −36° C. is 8% while it is 28% at 20° C. At −35° C. the solubility of $P_4S_{10}$ is 34%, and 52% at 20° C. Similarly, the solubility of $P_4S_3$ at −33.5° C. is 23%, and 44% at 20° C.

In practicing the present invention, it is advantageous to have the phosphorus sulfide completely in solution. Excess or free phosphorus sulfide is largely wasted, since the phosphorus in phosphorus sulfide as such is not readily available to plants. There is a further practical limitation. Substantially saturated solutions of phosphorus sulfides in liquid ammonia tend to be unduly thick and viscous, and therefore have undesirable flow properties. It is therefore preferred not to incorporate more of a particular phosphorus sulfide in the liquid ammonia than that which would provide a saturated solution at 0° C. At temperatures above 0° C., the solution will therefore be less than saturated, and these higher temperatures are the ones which will normally be encountered in the storage and application of the liquid ammonia solutions.

In practicing the present invention, it is advantageous to incorporate at least .05 lb. P per pound $NH_3$. On the other hand, it will usually not be necessary to incorporate more than .35 lb. P per lb. $NH_3$. For phosphorus pentasulfide, the preferred range is from .08 to .2 lb. P per lb. $NH_3$. Since phosphorus sesquisulfide is somewhat more soluble in liquid ammonia than phosphorus pentasulfide, the desirable concentrations may be somewhat greater. The desirable concentrations for phosphorus heptasulfide will be somewhat lower than for phosphorus pentasulfide because of its lesser solubility in liquid ammonia. The phosphorus sulfides on dissolution form clear solutions, the solutions of phosphorus pentasulfide and esquisulfide in liquid ammonia having a reddish brown color while the solution of phosphorus heptasulfide in liquid ammonia has a yellowish color.

After preparation, the solution of the phosphorus sulfide in liquid ammonia can be stored in the usual way for storing liquid ammonia solutions. The same equipment can be used as in the prior practice with pure liquid ammonia. As previously indicated, the solutions have the advantage of providing a lower vapor pressure at a given temperature than the pure liquid ammonia. The ammonia solutions can be applied to the soil by the procedures previously employed for anhydrous liquid ammonia. The solution is advantageously released below the surface of the soil so that it comes in intimate contact with the soil, thereby permitting the ammonia to be absorbed by the clay in the soil, and the ammonia-phosphorus sulfide complex to be deposited in the soil.

In connection with the present invention, it has been determined that phosphorus pentasulfide forms complexes with ammonia which will vary in ammonia content depending on the temperature at which the complexes were formed. For example, at a temperature of −32.7° C. phosphorus pentasulfide formed a probable complex of $(NH_3)_{10}P_4S_{10}$, while at temperatures ranging from −10 to 20° C. the empirical formula of the complex appeared to be $(NH_3)_{12}P_4S_{10}$. Evidence indicates that phosphorus sesquisulfide forms the complex $(NH_3)_8P_4S_3$ at all temperatures of preparation, while phosphorus heptasulfide shows a probable complex $(NH_3)_{12}P_4S_7$ at all temperatures from −36° C. to 20° C.

The method of this invention is further illustrated by the following specific examples.

*Example 1*

The water solubility of ammoniated phosphorus sulfides were determined by preparing aqueous solutions of the compounds, letting the solutes dissolve in water for two to three hours, filtering the solutions, and using a colorimetric determination method to analyze phosphorus in the filtrates. The method employed is set out in Analytical Chemistry, 25:336 (1953). Each colorimetric analysis was made on a clear, saturated solution. The results are set out below in Table B.

TABLE B

| Solute | Temperature, ° C. | Total, Percent | | N atoms per P atom | Water soluble, Percent | |
|---|---|---|---|---|---|---|
| | | P | N | | P | N |
| $P_4S_{10}$ | −32.7 | 21.20 | 18.39 | 2.555 | 18.46 | 18.36 |
| | −10.0 | 22.43 | 16.64 | 2.984 | 19.80 | 16.60 |
| | 20.0 | 22.50 | 17.36 | 2.869 | 19.16 | 16.61 |
| $P_4S_3$ | −32.5 | 15.35 | 18.69 | 1.818 | 14.56 | 7.80 |
| | 0.0 | 15.60 | 18.63 | 1.853 | 14.33 | 11.12 |
| | 20.0 | 16.68 | 18.26 | 2.021 | 14.70 | 10.11 |
| $P_4S_7$ | −36.0 | 20.74 | 15.11 | 3.040 | 17.29 | 14.46 |
| | 0.0 | 18.90 | 14.51 | 2.884 | 17.39 | 14.43 |
| | 20.0 | 19.27 | 15.25 | 2.798 | 16.95 | 11.98 |

*Example 2*

Where it is desired to apply approximately 50 lbs. of available phosphorus per acre in combination with 200 lbs. of nitrogen by the method of this invention, 180 parts by weight of phosphorus pentasulfide is dissolved in 240 parts by weight of liquid ammonia. This ratio results in a solution close to the concentration at saturation at 0° C. The resulting solution is then applied to the soil at the rate of 420 lbs. of solution per acre.

*Example 3*

A 58–19–0 fertilizer can be prepared by dissolving 3 parts by weight of phosphorus pentasulfide per 7 parts of liquid ammonia. On a nitrogen-$P_2O_5$ basis this fertilizer solution would contain approximately 3 parts of nitrogen per part by weight of $P_2O_5$.

*Example 4*

The range of fertilizer solutions which can be prepared from phosphorus pentasulfide and liquid ammonia according to the present invention is illustrated below by Table C.

TABLE C

| Approx. Ratios (weight) | | Approx. Ratios (weight) | | Fertilizer Grade | | |
|---|---|---|---|---|---|---|
| N | $P_2O_5$ | $NH_3$ | $P_4S_{10}$ | N | $P_2O_5$ | $K_2O$ |
| 1.7 | 1 | 1.33 | 1 | 48 | 28 | 0 |
| 2 | 1 | 1.55 | 1 | 50 | 25 | 0 |
| 3 | 1 | 2.33 | 1 | 57 | 19 | 0 |
| 4 | 1 | 3.01 | 1 | 62 | 16 | 0 |

*Example 5*

The range of fertilizer solutions which can be prepared from phosphorus sesquisulfide and liquid ammonia in accordance with the present invention is illustrated below by Table D.

TABLE D

| Approx. Ratios (weight) | | Approx. Ratios (weight) | | Fertilizer Grade | | |
|---|---|---|---|---|---|---|
| N | $P_2O_5$ | $NH_3$ | $P_4S_3$ | N | $P_2O_5$ | $K_2O$ |
| 1.1 | 1 | 1.77 | 1 | 52 | 46 | 0 |
| 1 | 1 | 1.56 | 1 | 50 | 50 | 0 |
| 2 | 1 | 3.14 | 1 | 62 | 31 | 0 |
| 3 | 1 | 4.69 | 1 | 66 | 22 | 0 |
| 4 | 1 | 6.25 | 1 | 72 | 18 | 0 |

*Example 6*

The range of fertilizer solutions which can be prepared from phosphorus heptasulfide and liquid ammonia in accordance with the present invention is illustrated below by Table E.

TABLE E

| Approx. Ratios (weight) | | Approx. Ratios (weight) | | Fertilizer Grade | | |
|---|---|---|---|---|---|---|
| N | $P_2O_5$ | $NH_3$ | $P_4S_7$ | N | $P_2O_5$ | $K_2O$ |
| 4 | 1 | 3.80 | 1 | 65 | 17 | 0 |
| 5 | 1 | 4.80 | 1 | 68 | 14 | 0 |

*Example 7*

The solutions containing the phosphorus sulfides exhibit lower vapor pressures than does pure liquid ammonia. Typical reductions are set forth below in Table F for solutions at 0° C. and 20° C.

TABLE F

| | Wt. ratio [1] | Mole Ratio [2] | Vapor pressure, p.s.i.a. | |
|---|---|---|---|---|
| | | | 0° | 20° |
| $P_4S_{10}$ | 0 | 0 | 63 | 125 |
| | 0.17 | 0.0065 | 62 | 124 |
| | 0.52 | 0.0199 | 56 | 118 |
| | 0.62 | 0.0237 | 52 | 110 |
| | 0.75 | 0.0287 | 51 | 106 |
| | 1.00 | 0.0383 | | 88 |
| $P_4S_3$ | 0 | 0 | 63 | 125 |
| | 0.165 | 0.0127 | 63 | 122 |
| | 0.236 | 0.0182 | 63 | 120 |
| | 0.457 | 0.0353 | 55 | 114 |
| | 0.650 | 0.0501 | | 105 |
| | 0.794 | 0.0612 | | 100 |
| $P_4S_7$ | 0 | 0 | 63 | 125 |
| | 0.12 | 0.0058 | 63 | 122 |
| | 0.146 | 0.0071 | 60 | 122 |
| | 0.189 | 0.0092 | 58 | 121 |
| | 0.256 | 0.0125 | 55 | 120 |
| | 0.380 | 0.0185 | | 115 |

[1] Lbs. sulfide/lb. $NH_3$ in solution (concentration).
[2] Moles sulfide/mole $NH_3$ (molar concentration).

Liquid anhydrous ammonia is ordinarily introduced into the soil through tubes approximately 6 inches below the soil surface. The tubes are attached to the following edge of a chisel and deposit the ammonia in a furrow made by the chisel. The construction is such that the soil immediately covers the deposit. This lessens the ammonia losses due to evaporation. The ammonia enters the tubes from a pressure tank. The tank pressure is equal to that of the ammonia vapor pressure and provides the necessary driving force for flow. The furrows are made 10 to 20 inches apart depending on the crop or desired rate of application. The ammonia-phosphorus sulfide solutions of this invention can be applied in the same manner. The lower vapor pressure will tend to reduce evaporation losses during application.

While in the foregoing specification this invention has been described in relation to preferred embodiments thereof and many details have been set forth for purpose of illustration, it will be apparent to those skilled in the art that the invention is susceptible to other embodiments than those specifically described herein and that many of the details set out can be varied considerably without departing from the basic principles of the invention.

We claim:
1. In the method of supplying nitrogen to soil for use by growing plants wherein liquid anhydrous ammonia is stored under super-atmospheric pressure and applied to the soil at atmospheric pressure, the improvement characterized by dissolving a phosphorus sulfide in said liquid anhydrous ammonia, storing the phosphorus sulfide-ammonia solution thus obtained, and thereafter applying said solution to the soil.

2. The method of claim 1 in which said phosphorus sulfide is phosphorus pentasulfide.

3. The method of claim 1 in which said phosphorus sulfide is phosphorus sesquisulfide.

4. The method of claim 1 in which said phosphorus sulfide is phosphorus heptasulfide.

5. The method of claim 1 wherein said phosphorus sulfide is dissolved in said liquid ammonia in a sufficient amount to provide at least .05 pound of phosphorus per pound of ammonia but not over the amount of said phosphorus sulfide which substantially saturates said ammonia at 0° C.

6. The method of claim 5 in which said phosphorus sulfide is selected from the group consisting of phosphorus pentasulfide, phosphorus sesquisulfide, and phosphorus heptasulfide.

References Cited
UNITED STATES PATENTS 2,970,049   1/1961   Dalton _____ 71—63
3,070,434  12/1962   Turner, et al. _____ 71—54

OTHER REFERENCES

Van Wazer, John R., "Miscellaneous Inorganic Phosphorus Compounds," in the Encyclopedia of Chemical Technology, Interscience Encyclopedia, Inc., vol. 10, pages 490–493 (1953).

DONALL H. SYLVESTER, *Primary Examiner.*

T. D. KILEY, *Assistant Examiner.*